Feb. 10, 1953     J. ZUBATY     2,628,295
SPEED REGULATOR FOR ELECTRIC MOTORS
Filed Dec. 18, 1950
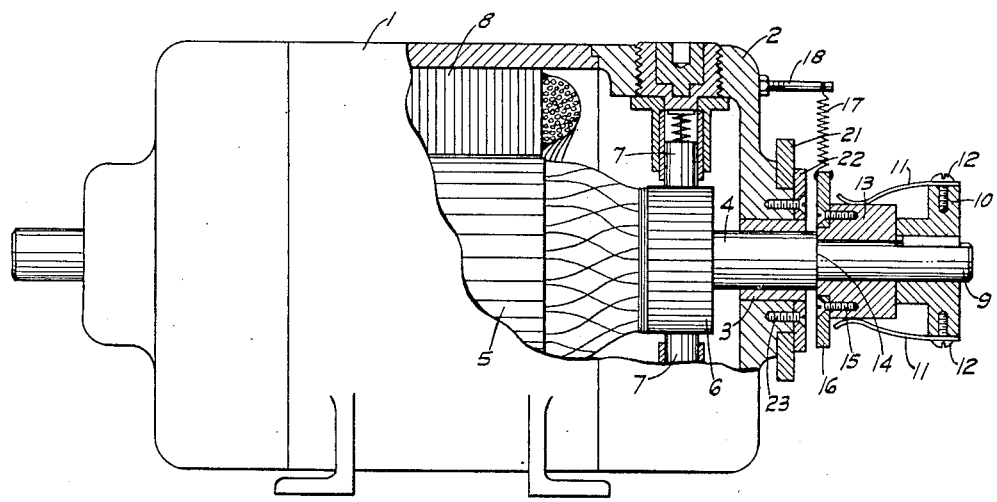
INVENTOR
JOSEPH ZUBATY
BY
ATTORNEY Patented Feb. 10, 1953

2,628,295

UNITED STATES PATENT OFFICE 2,628,295

SPEED REGULATOR FOR ELECTRIC MOTORS

Joseph Zubaty, Welland, Ontario, Canada, assignor to Gelling Industries Limited, Welland, Ontario, Canada Application December 18, 1950, Serial No. 201,381

8 Claims. (Cl. 200—80)

This invention relates to electric motors and particularly to means for controlling the speed thereof.

In a series wound motor speeds of rotation may become very high unless suitable means of control are provided. The object of this invention is to provide means for controlling the speed of such motors, particularly universal motors which operate on either alternating or direct current.

The object of the invention is the provision of a speed regulator of generally improved and simplified construction wherein the supply of current to the motor is regulated by centrifugal means carried by the motor shaft to maintain a substantially uniform motor speed.

Another object of the invention is to provide a speed regulator having contacts for making and breaking the circuit through an electric motor to control the speed thereof, the contacts for making and breaking the circuit being operated by centrifugal means carried by the motor shaft.

Other objects and advantages of the invention will be apparent from the following description of some embodiments of the invention and the novel features will be particularly pointed out hereinafter in connection with the appended claims.

In the accompanying drawing:

Figure 1 is a side view of a motor constructed according to my invention with the housing partly broken away to show a section thereof.

Figure 2 is an end view of the motor illustrated in Figure 1.

Figure 3 illustrates the electrical wiring diagram of an electric motor constructed according to my invention.

Referring to the drawings, 1 is the motor housing to which is bolted in the usual manner end bells 2, having bearings 3 which support shaft 4 of armature 5, with its commutator 6. Brushes 7 contained within their guides contact commutator 6, and field coils 8 are shown arranged in the usual manner within housing 1. To shaft extension 9 is keyed or otherwise secured collar 10 which carries a plurality of prongs 11, being secured thereto by means of screws 12. Prongs 11, which are preferably made of a resilient or flexible material, are so bent as to possess a curved contour at their free ends. Supported by shaft extension 9 is a roller 13, which may be made of plastic, metal or other suitable material and suitably bored so that the shaft may turn freely within it, but is restrained from axial movement by means of the shaft shoulder 14. Screwed to roller 13 by screws 15 or fastened by other suitable means is a contact arm 16 made of an electrical insulating material and to which is fastened one end of a tension spring 17. The other end of spring 17 is attached to post 18 which protrudes from motor end bell 2. Mounted on contact arm 16 is tip support 19 which carries contact tip 20. End bell 2 is provided with a shoulder to receive hand control lever 21 which is turnable thereabout, and retained thereon by means of retaining ring 22 which is held in place by screws 23. Mounted on control lever 21 and insulated therefrom is a bracket 24 which is drilled and tapped to receive adjusting screw 25, the end of which carries a contact tip 26.

Electric conducting wires 27 and 28 convey the energy, a graphic representation of which is best seen in Figure 3 where $L_1$ and $L_2$ are the conductors, $F_1$ and $F_2$ are the field coils, $B_1$ and $B_2$ are the brushes, and C is the commutator. R represents the regulating switch with contact tips 20 and 26.

In the operation of my invention it will be noted that when the motor is energized collar 10 with its attached prongs 11 will rotate with the shaft, the collar being keyed to it. By reason of the pressure exerted by the curved portion of prongs 11 on roller 13 there is a frictional effort to turn roller 13 with its contact arm 16 in the direction of shaft rotation, so maintaining contact between the contact tips 20 and 26, and thus overcoming the tension in spring 17 which would otherwise separate them. As the speed of the shaft increases the centrifugal force will develop a tendency to straighten out the curved portion of prongs 11 and in so doing relieve the pressure on roller 13. With this pressure relieved the frictional effort to turn the contact arm in the direction of shaft rotation is also relieved whereupon spring 17 acting upon the contact arm raises it and in so doing breaks the contact between tips 20 and 26 thus breaking the electric circuit. With the circuit broken the speed of the motor is reduced which results in a reduction of centrifugal force in the prongs, and they, therefore, tend to assume their initial curved form, so producing pressure with its consequent frictional effort of turning on collar 13. This again produces a closed circuit through the contact tips 20 and 26. It is evident therefore, that an alternating making and breaking of electrical contact is obtained which thereby regulates the speed of the motor.

Adjustments so as to further control the speed of the motor can be made by increasing or decreasing the tension of spring 17; by increasing or decreasing the weight of prongs 11; by increasing or decreasing the initial pressure of prongs 11 upon roller 13; or by adjusting the relative position of stationary contact tip 26 by means of hand control lever 21.

In the event that the motor should come to a stop with the contact tips 20 and 26 in a separated position or if such contact tips should become separated after the motor has stopped, it will be necessary to bring the contact tips together mechanically in order that operation of the motor may be resumed. This may be done either by rotating the shaft 4 of the motor or by manually operating the contact lever 21 until contact tip 26 engages with contact tip 20.

It will be understood that I have described and shown the preferred forms of my invention, and that I may make such changes and alterations in the general arrangement and in the construction of minor details thereof as come within the scope of the appended claims without departing from the spirit of my invention and the principles involved.

What I claim as my invention is:

1. The combination in a centrifugally operated switch for electric motors of a contact disposed on the housing of the motor, a roller rotatably mounted on the shaft of the motor, a contact on the roller, a collar keyed to said shaft, means on the collar cooperating with the roller to move the contacts into engagement, and tension means carried on the housing to separate the contacts.

2. The combination in a centrifugally operated switch for electric motors of a contact disposed on the housing of the motor, a roller rotatably mounted on the shaft of the motor, a contact on the roller, tension means for holding the contacts out of engagement, a collar keyed to said shaft, and means on the collar cooperating with the roller to move the contact on the roller into engagement with the contact on the housing.

3. The combination in a centrifugally operated switch for electric motors of a contact disposed on the housing of the motor, a roller rotatably mounted on the shaft of the motor, a contact on the roller, tension means for holding the contacts out of engagement, a collar keyed to said shaft and means on the collar cooperating with the roller to move the contacts into engagement when the shaft is revolving at low speed and progressively out of engagement as the speed of the shaft increases.

4. The combination in a centrifugally operated switch for electric motors of a contact disposed on the housing of the motor, a roller rotatably mounted on the shaft of the motor, a contact on the roller, tension means for holding the contacts out of engagement, a collar keyed to said shaft, and means on the collar cooperating with the roller to move the contact on the collar into engagement with the contact on the housing when the shaft is revolving at low speed and to progressively permit the said tension means to move the contacts out of engagement as the speed of the shaft increases.

5. The combination in a centrifugally operated switch for electric motors of a contact disposed on the housing of the motor, a roller rotatably mounted on the shaft of the motor, a contact on the roller, tension means for holding the contacts out of engagement, and a collar keyed to the shaft and having disposed thereon a plurality of resilient prongs adapted to engage and bear against the periphery of the roller and to move the contact carried by the roller into engagement with the contact disposed on the housing.

6. The combination in a centrifugally operated switch for electric motors of a contact disposed on the housing of the motor, a roller rotatably mounted on the shaft of the motor, a contact on the roller, tension means for holding the contacts out of engagement and a collar keyed to the shaft and having disposed thereon a plurality of resilient prongs adapted to engage and bear against the periphery of the roller and to move the contact carried by the roller into engagement with the contact disposed on the housing and to progressively move out of engagement with the periphery of the roller as the speed of the shaft increases.

7. The combination in a centrifugally operated switch for electric motors of a contact disposed on the housing of the motor, a roller rotatably mounted on the shaft of the motor and keyed against axial movement thereon, a contact arm carried on the roller and having a contact thereon, tension means on the housing for holding the contacts out of engagement, a collar keyed to the shaft, and a plurality of resilient prongs carried on the collar and adapted to engage and bear against the periphery of the roller and to move the contact carried by the roller into engagement with the contact disposed on the housing when the shaft of the motor is revolving at relatively low speed, and to progressively move out of engagement with the periphery of the roller as the speed of the shaft increases.

8. The combination in a centrifugally operated switch for electric motors of a contact arm disposed on the housing of the motor, a contact mounted on the contact arm, a roller rotatably mounted on the shaft of the motor and keyed against axial movement thereon, a contact arm carried on the roller and having a contact thereon, tension means on the housing for holding the contacts out of engagement, manually operated means on the motor housing for varying the distance between the contacts, a collar keyed to the shaft, and a plurality of resilient prongs carried on the collar and adapted to engage and bear against the periphery of the roller and to move the contact carried by the roller into engagement with the contact disposed on the contact arm on the housing when the shaft of the motor is revolving at relatively low speed and to progressively move out of engagement with the periphery of the roller as the speed of the shaft increases.

JOSEPH ZUBATY.

REFERENCES CITED

The following references are of record in the file of this patent:

FOREIGN PATENTS

| Number | Country | Date |
|---|---|---|
| 670,184 | Germany | Jan. 13, 1939 |